(12) United States Patent
Cai et al.

(10) Patent No.: US 9,600,236 B2
(45) Date of Patent: Mar. 21, 2017

(54) SYSTEMS AND METHODS FOR COMPUTING MATHEMATICAL FUNCTIONS

(71) Applicant: Vivante Corporation, Sunnyvale, CA (US)

(72) Inventors: Mike M. Cai, Newark, CA (US); Lefan Zhong, San Jose, CA (US)

(73) Assignee: VIVANTE CORPORATION, San Jose, CA (US)

( * ) Notice: Subject to any disclaimer, the term of this patent is extended or adjusted under 35 U.S.C. 154(b) by 260 days.

(21) Appl. No.: 14/486,891

(22) Filed: Sep. 15, 2014

(65) Prior Publication Data
US 2015/0012578 A1 Jan. 8, 2015

Related U.S. Application Data

(63) Continuation-in-part of application No. 13/690,897, filed on Nov. 30, 2012, which is a continuation of application No. 11/493,714, filed on Jul. 25, 2006, now Pat. No. 8,346,831.

(51) Int. Cl.
| | |
|---|---|
| G06F 7/38 | (2006.01) |
| G06F 7/556 | (2006.01) |
| G06F 1/035 | (2006.01) |
| G06F 7/57 | (2006.01) |
| G06F 7/552 | (2006.01) |
| G06F 7/548 | (2006.01) |

(52) U.S. Cl.
CPC ............ *G06F 7/556* (2013.01); *G06F 1/0356* (2013.01); *G06F 7/57* (2013.01); *G06F 7/548* (2013.01); *G06F 7/5525* (2013.01); *G06F 2101/08* (2013.01); *G06F 2101/10* (2013.01); *G06F 2101/12* (2013.01)

(58) Field of Classification Search
CPC ........ G06F 2101/04; G06F 2101/08–2101/12; G06F 9/3001; G06F 17/17; G06F 17/10; G06F 2207/535–2207/5356; G06F 7/544–7/556; G06F 1/0356; G06F 7/57
USPC ......................................................... 708/233
See application file for complete search history.

(56) References Cited

U.S. PATENT DOCUMENTS

| | | | | |
|---|---|---|---|---|
| 7,640,285 | B1 * | 12/2009 | Oberman | .......... G06F 7/57 708/272 |
| 8,037,119 | B1 * | 10/2011 | Oberman | .......... G06F 7/4876 708/503 |
| 2012/0079250 | A1 * | 3/2012 | Pineiro | ......... G06F 9/3001 712/221 |

* cited by examiner

*Primary Examiner* — Tan V. Mai
(74) *Attorney, Agent, or Firm* — David R. Stevens; Stevens Law Group

(57) ABSTRACT

Mathematical functions are computed in a single pipeline performing a polynomial approximation (e.g. a quadratic approximation, or the like); and one or more data tables corresponding to at least one of the RCP, SQRT, EXP or LOG functions operable to be coupled to the single pipeline according to one or more opcodes; wherein the single pipeline is operable for computing at least one of RCP, SQRT, EXP or LOG functions according to the one or more opcodes. SIN and COS are also computed using the pipeline according to the approximation $((-1)\hat{}IntX)*Sin(\pi*Min(FracX, 1.0-FracX)/Min(FracX, 1.0-FracX)$. A pipeline portion approximates $Sin(\pi*FracX)$ using tables and interpolation and a subsequent stage multiplies this approximation by FracX. For input arguments of x close 1.0. LOG $2(x-1)/(x-1)$ is computed using a first pipeline portion using tables and interpolation and subsequently multiplied by $(x-1)$. A DIV operation may also be performed with input arguments scaled up to avoid underflow as needed.

18 Claims, 5 Drawing Sheets

SYSTEMS AND METHODS FOR COMPUTING MATHEMATICAL FUNCTIONS

RELATED APPLICATION

This application is a continuation-in-part of U.S. application Ser. No. 13/690,897, filed Nov. 30, 2012 which is hereby incorporated herein by reference in its entirety. This application is also a continuation of U.S. application Ser. No. 11/493,714, filed Jul. 25, 2006, which is hereby incorporated herein by reference in its entirety

BACKGROUND

Field of the Invention

The invention related generally to the field of computer systems and more particularly to computational functions for graphics processor chips Background of the Invention Graphics processor chips traditionally employ various mathematical functions implemented in hardware for fast drawing and rendering speed. Some examples of these mathematical functions include reciprocal function ("RCP"), reciprocal square root function ("SQRT"), exponential function ("EXP") and logarithmic function ("LOG"). These mathematical functions are implemented in prior art as separate circuitry blocks with different algorithms.

For example, in a three cycle RCP implementation in the prior art, a floating point number x may be represented as a concatenation of a most significant bits ("MSB") portion x0 and a least significant bits ("LSB") portion x1 where x1=x−x0. The main calculation for reciprocal of x is in the calculation of mantissa. Mantissa is typically calculated in a two term function: $f(x)=a+b(x-x0)$ in the prior art, where a and b are data look up tables. In a typical example, where more than 21 bit precision is required for a graphics processor, there needs to be over 16,000 entries in each of the data look up tables a and b to achieve the required precision. This is based on a 14 bit x0 and data look up tables with $2.^{14}$ entries each. The hardware implementation of such large data look up tables results in large gate counts proportional to the size of the data look up tables. Graphic processor chips may include hardware implementation of several mathematical functions. In prior art examples, each of these mathematical functions requires large gate count and is typically combined with other methods. It is common technique in the prior art to implement each of these mathematical functions with separate logic circuitry and separate large data look up tables. As high speed and mobile applications demand higher integration and lower power consumption, there are needs for an efficient algorithm to implement these various mathematical functions.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
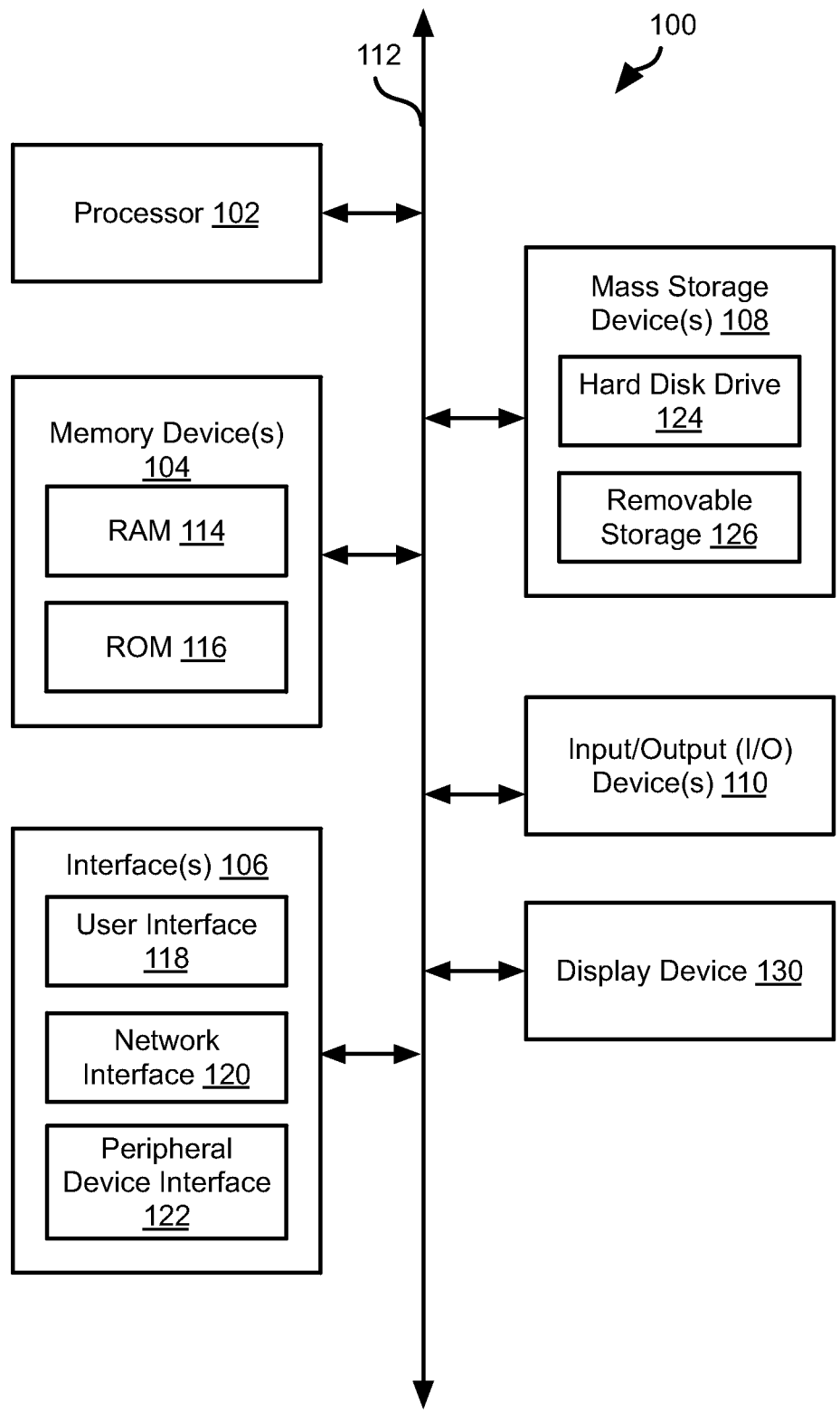
FIG. 1 is a schematic block diagram of a computer system.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
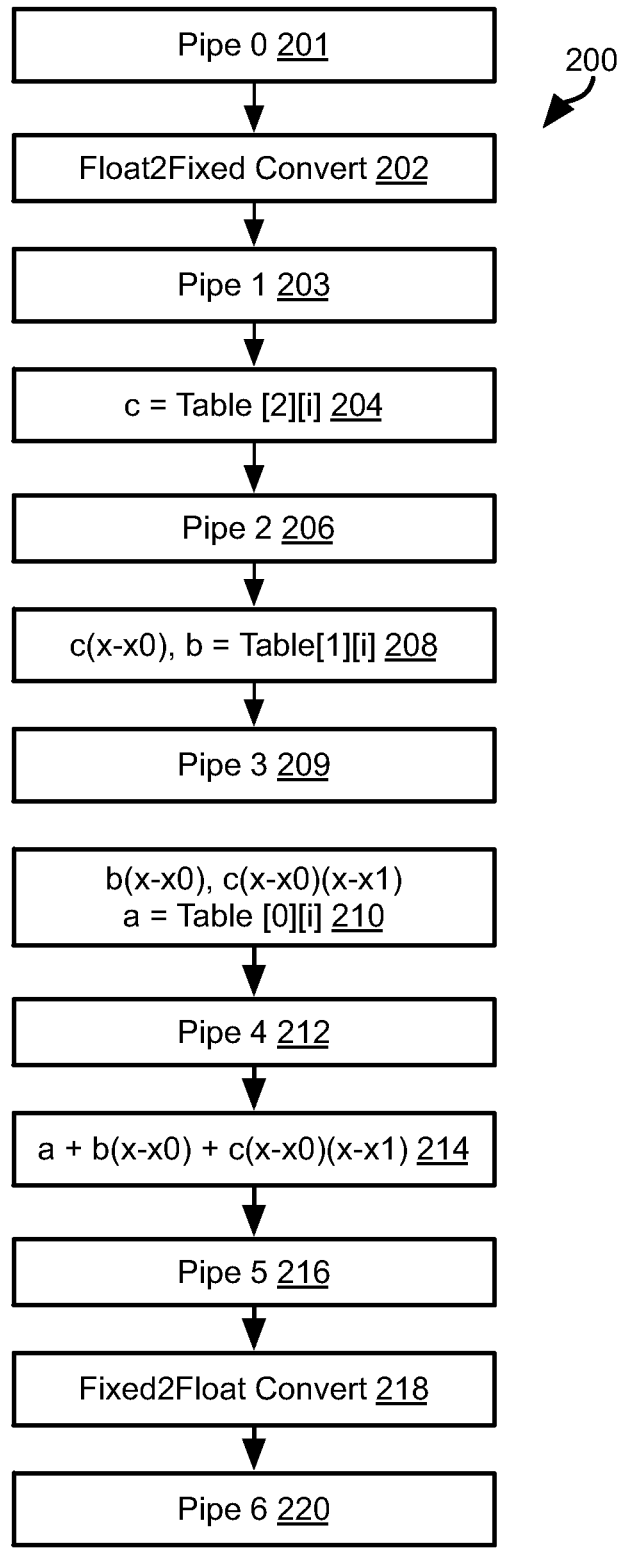
FIG. 2 is a block diagram illustrating a 6 stage unified hardware pipeline according to an embodiment of the present invention.

FIG. 2 is a block diagram illustrating a 6 stage unified hardware pipeline according to an embodiment of the present invention. Here, block 101, block 103, block 105, block 107, block 109, block 111, and block 113 are the register stages of the pipeline. Block 102 is a floating point to fixed point converter. Block 112 is a fixed point to floating point converter. In an example, block 112 may be configured to be bypassing circuit according to an opcode (i.e., a configuration instruction, a micro-code, or the like) for implementing an EXP function. In another example block 102 may be configured to be bypassing circuit according to another opcode (i.e., a configuration instruction, a micro-code, or the like) for implementing an LOG function. In still other examples, both block 102 and block 112 may be configured to be bypassing circuits according to yet another opcode (i.e., a configuration instruction, a micro-code, or the like) in implementing RCP or SQRT functions. In some examples, block 104, 106, 108, and 110 may implement various portions of the quadratic approximation for calculating mathematical functions such as RCP, SQRT, EXP, LOG or the like based on separate data look up tables. For example, block 104 implements data table look up for c based on an integer i corresponding to mantissa of a floating point number x. Likewise, block 106 implements data table look up for b. During the same pipeline stage, block 106 also calculates c(x−x0). Similarly, block 108 implements data table look up for a as well as calculation of b(x−x0) and c(x−x0)(x−x1). Block 110 implements summation of three terms for calculating the quadratic approximation. The above description is not limited to the details described above and various modifications or alternations as made obvious by the above description may be made.

Figure 3:
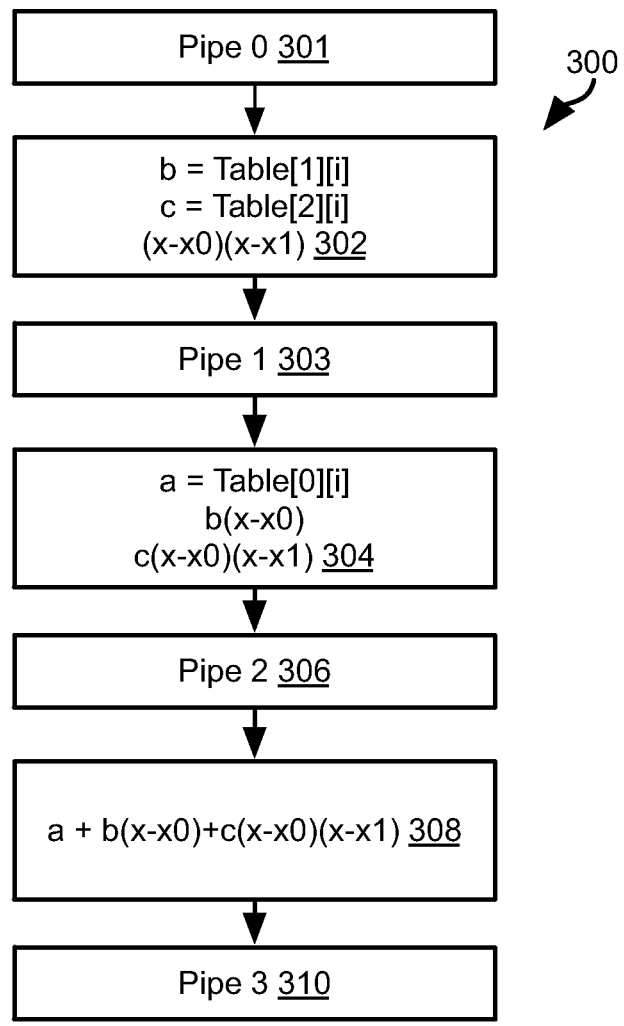
FIG. 3 is a block diagram illustrating a 3 stage RCP hardware pipeline according to an embodiment of the present invention.

FIG. 3 is a block diagram illustrating a 3 stage RCP hardware pipeline according to an embodiment of the present invention. Here, block 201, block 203, block 205, and block 207 are the register stages of the pipeline. In some examples, block 202, 204, and 206 may implement various portions of the quadratic approximation. For example, block 202 implements data table look up for b and c based on an integer i corresponding to MSB of mantissa of a floating point number. During the same pipeline stage, block 202 also calculates (x−x0)(x−x1). Likewise, block 204 implements data table look up for a as well as calculation of b(x−x0) and c(x−x0)(x−x1). In some implementations (x1−x) may be calculated as NOT(x−x0), where NOT is the bitwise operation that changes 1 to 0 and 0 to 1. Block 206 implements summation of three terms for calculating the quadratic approximation. The above description is not limited to the details described above and various modifications or alternations as made obvious by the above description may be made.

Figure 4:
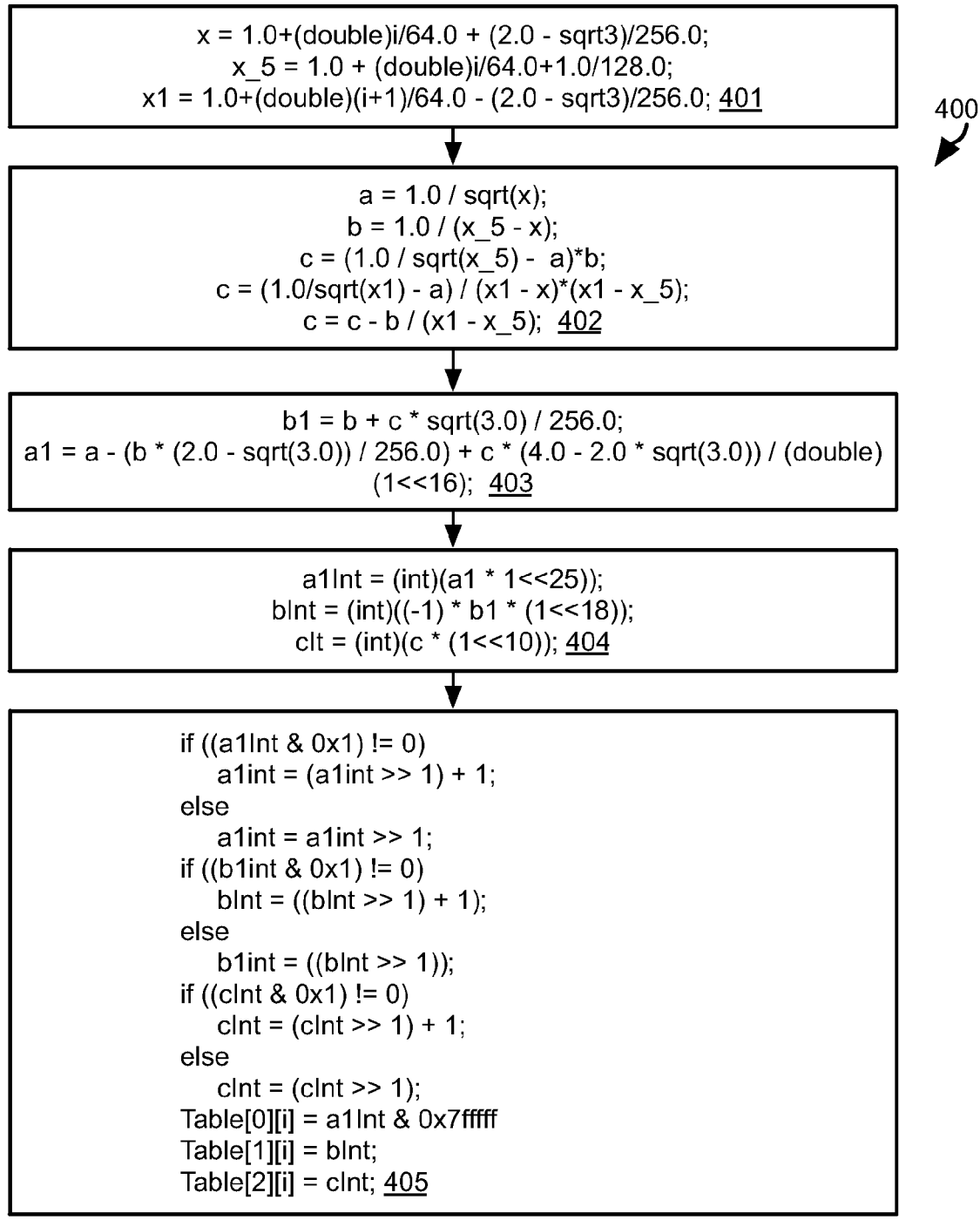
FIG. 4 is a flow chart diagram illustrating an algorithm for calculating various exemplary data look up table according to an embodiment of the present invention.

FIG. 4 is a flow chart diagram illustrating an exemplary algorithm for calculating various data look up tables according to an embodiment of the present invention. Here, an exemplary algorithm is illustrated for computing data tables a, b and c for SQRT. In this example, table[0][i]=a, table[1][i]=b and table[2][i]=c. Three linear equations are used to compute three values a, b and c. These three equations are solved by first computing the start point (i.e., x), middle point (i.e., x.sub.-5) and end point (i.e., x1) of a segment (301). Blocks 302 and 303 compute a, b and c in floating point format. Block 304 converts a, b and c to integer format. Block 305 does the rounding and produces the final value. As another example, the "sqrt" function in block 302 may be replaced by reciprocal function to adapt the algorithm for computing data tables a, b and c for RCP. In other examples, the "sqrt" function in block 302 may be replaced by other functions (e.g., EXP, LOG, or the like) to adapt the algorithm for computing data tables a, b and c for these other functions. The above description is not limited to the details described above and various modifications or alterations as made obvious by the above description may be made. The flow chart of FIG. 4 may be suitable for implementing a table of 64 entries. Other entries, such as 128 entries may also be used.

The above-described method provides a unified method to compute the list of above-identified transcendental functions with one unified hardware pipeline in floating point values, such as for a vertex shader and pixel shader in a mobile graphics chip. This technique may be based on computing of the following: $F(x)=1/x$; $F(x)=1/x^{(1/2)}$; $F(x)=2^x$ and $F(x)=\text{LOG } 2(x)$.

These functions are implemented with a unified hardware pipe that performs the following function: $F(x)=a+b(x-x0)+c(x-x0)(x-x1)$ (hereinafter "the interpolation function"). The approximation may be done in 64, 128, or some other number segments, where x0 is the starting value of a segment and x1 is the ending value of a segment. X0 is the MSB (most significant bits) portion of x, (x−x0) is the LSB (least significant bits) of portion of x. The value of x is between x0 and x1 (x0<=x<x1). The values a, b and c are from three separate tables, such as tables embedded in hardware.

For EXP, a floating point to fixed point number conversion stage is positioned before the unified hardware pipe. For LOG, there is a fixed point to floating point number conversion after the unified hardware pipe. The hardware flow and function is the same for each of the four functions, except the table chosen for each function is different. An input opcode chooses the function. The low latency efficiency RCP (reciprocal) implementation based on this approach can be reduced to 3 cycles.

Figure 5:
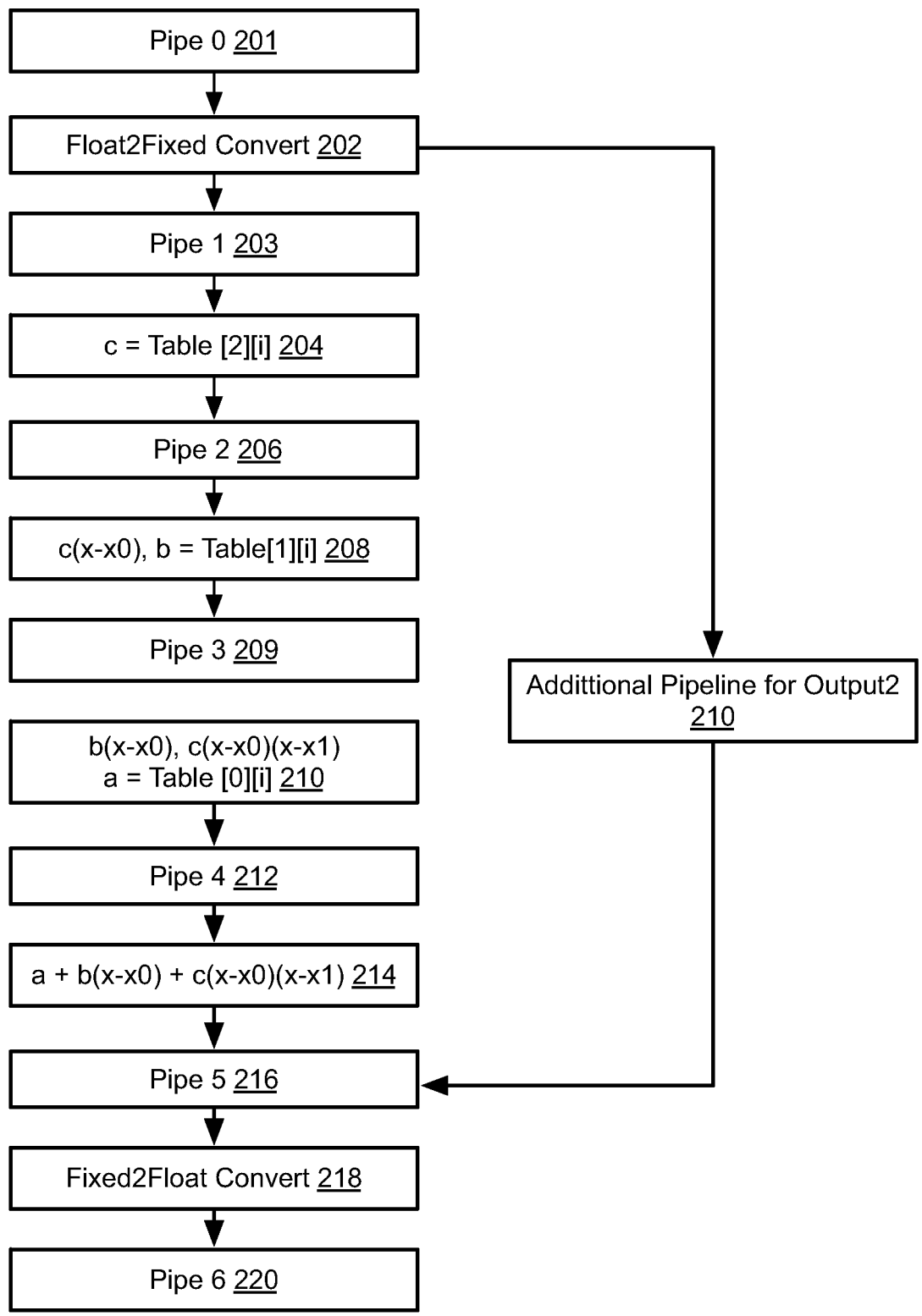
FIG. 5 is a flow chart diagram illustrating an alternative unified hardware pipeline according to an embodiment of the present invention.

Referring to FIG. 5, logic devices may be added to the pipeline of FIGS. 1 and 2 to speed up the calculation of $\text{Sin}(\pi x)$, $\text{Cos}(\pi x)$, LOG 2(x) and DIV (i.e. y/x). For example, the additional logic may be implemented based on the formula: $\text{Sin}(\pi x)=\text{Sin}(\pi*(\text{IntX}+\text{FracX}))=(-1)^{\text{IntX}}*\text{Sin}(\pi*\text{FracX})$, where IntX is the integer portion of an input floating point argument x and FracX is the fractional portion of the input x. Accordingly, instead of approximate $\text{Sin}(\pi x)$ directly, it may be approximated according to $F(x)=\text{Sin}(\pi*\text{FracX})/\text{FracX}$. Accordingly, the modified pipeline of FIG. 5 may produce an additional output (output2) equal to FracX, such as from the Float2Fixed converting logic 202. The pipeline may be further modified to compute $\text{Sin}(\pi x)=F(x)*\text{output2}$, where F(x) is the approximation of the function $\text{Sin}(\pi*\text{FracX})/\text{FracX}$, such as according to the pipeline stages 203-214. Specifically, F(x) is the result of interpolation among entries of tables selected according to the value of FracX as the input argument, such as according to the pipelines and methods as described hereinabove. In the illustrated embodiment, multiplication of F(x) by output2 may be performed at stage 216 of the pipeline. For $\text{Cos}(\pi x)$, $\text{Cos}(\pi x)=\text{Sin}(\pi(x+0.5))$. So the same logic of Sin $(\pi x)$ may be used to get the result. In some embodiment, $\text{Sin}(\pi x)$ is computed using $F(x)=\text{Sin}(\pi*\text{FracX})/\text{FracX}$ and output2=FracX if (FracX<=0.5 f), where 0.5 f is a floating point value equal to ½. In some embodiments for $\text{Sin}(\pi x)$, if FracX>0.5 f, $F(x)=\text{Sin}(\pi*(1.0-\text{FracX}))/(1.0-\text{FracX})$, and output2 is 1.0−FracX. For example, more generally, for $\text{Sin}(\pi x)$, $F(x)=((-1)^{\text{IntX}})*\text{Sin}(\pi*\text{Min}(\text{FracX}, 1.0-\text{FracX}))/\text{Min}(\text{FracX}, 1.0-\text{FracX})$, the output2 is Min(FracX, 1.0−FracX), where IntX is the integer portion of x.

When input argument x is close to 1.0, Log 2(x) is very small. Instead of approximation LOG 2(x) directly, it may be approximated as $F(x)=\text{Log } 2(x-1)/(x-1)$. Accordingly, for LOG 2 output2 may be set equal to x−1. So $\text{LOG } 2(x)=F(x)*\text{output2}$, where output2 is equal to (x−1) and F(x) is an approximation of LOG 2(x−1)/(x−1) computed using tables and interpolation within the hardware pipeline as described herein. The values of x for which this modification is performed by be selected based on the floating point representation used. For example, in some embodiments, when x is in the range of [0.75, 1.5), $F(x)=\text{LOG } 2(x-1)/(x-1)$, output2=(x−1). Otherwise, for LOG 2(x), $F(x)=\text{LOG } 2(x)$, and output2=1.0 f.

For DIV (e.g. y/x), using the relationships $y/x=y*(1/x)=y*\text{Rcp}(x)$, there may be 1/x underflow issue, when $|x|>2^{126}$, 1/x=0 in z 32 bit floating point expression.

Underflow at $|x|>2^{\wedge}126$ occurs since the maximum floating point value is $2^{\wedge}127*1.11111111$ and in "floating point normal expression", the minimum value is $2^{\wedge}(-126)$. Where denormalized numbers are used, the minimum value can be $2^{\wedge}(-149)$. In this case, both input arguments x and y may be scaled by $2^{\wedge}32$, i.e. $y/x=(y/2^{\wedge}32)/(x/2^{\wedge}32)$. So in the hardware pipeline, an additional pipeline stage may be used to scale down both y/x when x is over some range (e.g. greater than $2^{\wedge}64$). This additional stage may be performed prior to pipeline steps for selecting table values and performing the interpolation steps as described herein.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. An apparatus for computing mathematical functions, the apparatus comprising:
    a first hardware pipeline configured to receive an argument x and an opcode and perform a polynomial approximation of second degree or higher, the first hardware pipeline including a plurality of stages; and
    a plurality of data tables, each associated with at least one of LOG (logarithm), COS (cosine), DIV (division), and SIN (sine) functions and configured to be coupled to the first hardware pipeline according to the at least one opcode, wherein each of the plurality of data tables includes data associated with implementing the associated function, the first hardware pipeline being configured to calculate a value A(x) by performing the polynomial approximation using data from the data tables of the plurality of data tables corresponding to the opcode and x;
    a second hardware pipeline configured to calculate an adjustment factor B(x) corresponding to the opcode; and
    wherein the first hardware pipeline further configured to calculate an output value as B(x)*A(x);
    the second hardware pipeline is configured to output a factional portion of x (FracX) when the opcode indicates one of the COS function and the SIN function, wherein B(x) is a function of FracX; and
    the first hardware pipeline and the plurality of data tables are configured such that the polynomial approximation using data from the data tables is effective to approximate A(x) as $((-1)^{\wedge}IntX)*Sin(pi*Min(FracX, 1.0-FracX))/Min(FracX, 1.0-FracX)$, where IntX is an integer portion of x, when the opcode indicates the SIN function and $Sin(pi*(FracX+0.5))$ when the opcode indicates the COS function.

2. The apparatus of claim 1, wherein:
    the second hardware pipeline is configured to output B(x) when the opcode indicates the LOG function as (x−1); and
    the first hardware pipeline and plurality of data tables are configured to output A(x) as $Log_2(x-1)/(x-1)$ when the opcode indicates the LOG function and x is within a threshold amount from 1.0.

3. The apparatus of claim 1, wherein the first hardware pipeline and the plurality of data tables are further configured to receive a second argument y and is configured to scale x and y to obtain xs and ys when the opcode indicates the DIV function such that xs=x/C and ys=y/C if $|x|>D$, where D is four times D, the first hardware pipeline further configured to use the data table of the plurality of data tables corresponding to the DIV function to compute A(x) as ys*1/xs and one of omit multiplication of A(a) by B(x) and use B(x) equal to 1 when the opcode indicates the DIV function.

4. The apparatus of claim 3, wherein C is $2^{\wedge}32$ and D is $2^{\wedge}64$.

5. The apparatus of claim 1, wherein the polynomial approximation is if a function of both of (x−x0) and (x−x1), where F(x) is an intermediate value used in the single hardware pipeline, x is an operand, x0 is a value greater than the operand, and x1 is a value smaller than the operand.

6. The apparatus of claim 1, wherein the polynomial approximation is a quadratic approximation that includes a term of the form (x−x0).

7. The apparatus of claim 6, wherein the quadratic approximation includes a term of the form (x−x0)*(x−x1).

8. The apparatus of claim 7, wherein the first hardware pipeline is configured to calculate (x−x1) as NOT(x−x0).

9. The apparatus of claim 7, wherein the quadratic approximation is of the form A(x)=a+b*(x−x0)+c*(x−x0)*(x−x1), where values a, b, and c correspond to the values x0 and x1 and are retrieved from the plurality of data tables as coupled to the first hardware pipeline according to the at least one opcode.

10. A method for computing mathematical functions, the method comprising:
    receiving by a first hardware pipeline an argument x and an opcode;
    performing in the first hardware pipeline a polynomial approximation of second degree or higher, the first hardware pipeline including—
    a plurality of stages; and
    a plurality of data tables, each associated with at least one of LOG (logarithm), COS (cosine), and SIN (sine) functions and configured to be coupled to the first hardware pipeline according to the at least one opcode, wherein each of the plurality of data tables includes data associated with implementing the associated function, the first hardware pipeline being configured to calculate a value A(x) by performing the polynomial approximation with respect to data from the data tables of the plurality of data tables corresponding to the opcode and x;
    calculating in a second hardware pipeline an adjustment factor B(x) corresponding to the opcode;
    calculating in the first hardware pipeline an output value as B(x)*A(x);
    calculating, in the second hardware pipeline, a factional portion of x (FracX) when the opcode indicates one of the COS function and the SIN function, wherein B(x) is a function of FracX; and
    calculating A(x) in the first hardware pipeline using the plurality of data tables to approximate A(x) as ((−1)

^IntX)*Sin(pi*Min(FracX, 1.0−FracX))/Min(FracX, 1.0−FracX), where IntX is an integer portion of x, when the opcode indicates the SIN function and as Sin(pi*(FracX+0.5)) when the opcode indicates the COS function.

11. The method of claim 10, further comprising:
calculating in the second hardware pipeline the adjustment factor B(x) as (x−1) when the opcode indicates the LOG function; and
calculating A(x) as $Log_2(x-1)/(x-1)$ when the opcode indicates the LOG function and x is within a threshold amount from 1.0.

12. The method of claim 10, further comprising:
receiving by the first hardware pipeline a second argument y;
scaling x and y to obtain xs and ys when the opcode indicates the DIV function such that xs=x/C and ys=y/C if |x|>D, where D is four times D, the first hardware pipeline further configured to use the data table of the plurality of data tables corresponding to the DIV function to compute A(x) as ys*1/xs and one of omit multiplication of A(a) by B(x) and use B(x) equal to 1 when the opcode indicates the DIV function.

13. The method of claim 12, wherein C is 2^32 and D is 2^64.

14. The method of claim 10, wherein the polynomial approximation is if a function of both of (x−x0) and (x−x1), where F(x) is an intermediate value used in the single hardware pipeline, x is an operand, x0 is a value greater than the operand, and x1 is a value smaller than the operand.

15. The method of claim 10, wherein the polynomial approximation is a quadratic approximation that includes a term of the form (x−x0).

16. The method of claim 15, wherein the quadratic approximation includes a term of the form (x−x0)*(x−x1).

17. The method of claim 16, wherein the first hardware pipeline is configured to calculate (x−x1) as NOT(x−x0).

18. The method of claim 16, wherein the quadratic approximation is of the form A(x)=a+b*(x−x0)+c*(x−x0)*(x−x1), where values a, b, and c correspond to the values x0 and x1 and are retrieved from the plurality of data tables as coupled to the first hardware pipeline according to the at least one opcode.

* * * * *